(12) United States Patent
Shin et al.

(10) Patent No.: US 9,350,015 B2
(45) Date of Patent: May 24, 2016

(54) ANODE ACTIVE MATERIAL, ANODE AND LITHIUM BATTERY INCLUDING THE MATERIAL, AND METHOD OF PREPARING THE MATERIAL

(75) Inventors: Chang-Su Shin, Yongin-si (KR); Jae-Myung Kim, Yongin-si (KR); So-Ra Lee, Yongin-si (KR); Ui-Song Do, Yongin-si (KR); Beom-Kwon Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1042 days.

(21) Appl. No.: 13/415,247

(22) Filed: Mar. 8, 2012

(65) Prior Publication Data
US 2012/0270108 A1  Oct. 25, 2012

(30) Foreign Application Priority Data

Apr. 19, 2011 (KR) .................. 10-2011-0036392
Apr. 19, 2011 (KR) .................. 10-2011-0036393
Feb. 29, 2012 (KR) .................. 10-2012-0020984

(51) Int. Cl.
| | |
|---|---|
| *H01M 4/36* | (2006.01) |
| *B82Y 30/00* | (2011.01) |
| *H01M 4/38* | (2006.01) |
| *H01M 4/13* | (2010.01) |
| *H01M 4/139* | (2010.01) |
| *H01M 4/485* | (2010.01) |
| *H01M 4/587* | (2010.01) |

(Continued)

(52) U.S. Cl.
CPC .............. *H01M 4/366* (2013.01); *B82Y 30/00* (2013.01); *H01M 4/13* (2013.01); *H01M 4/139* (2013.01); *H01M 4/38* (2013.01); *H01M 4/485* (2013.01); *H01M 4/587* (2013.01); *H01M 4/625* (2013.01); *H01M 10/052* (2013.01); *H01M 2004/027* (2013.01); *Y02E 60/122* (2013.01)

(58) Field of Classification Search
CPC ....... H01M 4/366; H01M 4/13; H01M 4/485; H01M 4/625; H01M 4/587; H01M 10/052; H01M 2004/027; Y02E 60/122
See application file for complete search history.

(56) References Cited

U.S. PATENT DOCUMENTS

| | | | |
|---|---|---|---|
| 6,482,547 B1 | 11/2002 | Yoon et al. | |
| 7,745,047 B2 | 6/2010 | Zhamu et al. | |

(Continued)

FOREIGN PATENT DOCUMENTS

| | | |
|---|---|---|
| CN | 1335651 A | 2/2002 |
| CN | 101783401 A | 7/2010 |

(Continued)

OTHER PUBLICATIONS

Extended European Search Report dated Jul. 23, 2012 for European Patent Application No. EP 12 164 486.8 which shares priority of Korean Patent Application No. KR 10-2011-0036392 with captioned U.S. Appl. No. 13/415,247.

(Continued)

*Primary Examiner* — Laura Weiner
(74) *Attorney, Agent, or Firm* — Knobbe Martens Olson & Bear LLP

(57) ABSTRACT

In one aspect, an anode active material is provided. The anode active material may include a crystalline carbon-based material that includes a core having a lattice spacing $d_{002}$ of about 0.35 nm or more, and titanium-based oxide particles.

9 Claims, 7 Drawing Sheets

(51) Int. Cl.
    *H01M 4/62*    (2006.01)
    *H01M 4/02*    (2006.01)
    *H01M 10/052*  (2010.01)

(56) References Cited

U.S. PATENT DOCUMENTS

| | | |
|---|---|---|
| 2002/0009646 A1 | 1/2002 | Matsubara et al. |
| 2004/0202934 A1 | 10/2004 | Zaghib et al. |
| 2006/0115732 A1 | 6/2006 | Zaghib et al. |
| 2007/0190413 A1 | 8/2007 | Lee et al. |
| 2007/0264568 A1 | 11/2007 | Ryu et al. |
| 2008/0285211 A1 | 11/2008 | Zaghib et al. |
| 2010/0171466 A1 | 7/2010 | Spitler et al. |
| 2010/0273058 A1 | 10/2010 | Lee et al. |
| 2011/0274970 A1 | 11/2011 | Lee et al. |
| 2012/0135303 A1 | 5/2012 | Hong et al. |

FOREIGN PATENT DOCUMENTS

| | | |
|---|---|---|
| CN | 101849302 A | 9/2010 |
| EP | 1 775 786 A1 | 4/2007 |
| JP | 2005-243508 A | 9/2005 |
| JP | 2005-533373 A | 11/2005 |
| JP | 2006-269110 A | 10/2006 |
| JP | 2007-214137 A | 8/2007 |
| JP | 2009-151956 A | 7/2009 |
| JP | 2009-238656 A | 10/2009 |
| JP | 2010-123300 A | 6/2010 |
| JP | 2010-226116 A | 10/2010 |
| KR | 10-0277792 B1 | 10/2000 |
| KR | 10-2004-0096279 A | 11/2004 |
| KR | 10-2005-0013841 A | 2/2005 |
| KR | 10-2005-0087245 A | 8/2005 |
| KR | 10-2007-0113066 A | 11/2007 |
| KR | 10-2011-0122509 A | 11/2011 |
| WO | WO 02/46101 A2 | 6/2002 |
| WO | WO 2007/083896 A1 | 7/2007 |
| WO | WO 2009/061013 A1 | 5/2009 |
| WO | WO 2010/130684 A1 | 11/2010 |

OTHER PUBLICATIONS

Wang et al., "Synthesis and characterization of $TiO_2$-carbon nanocomposites with both micro- and mesopore size distributions," *Materials Letters*, 64 (2010) pp. 2205-2207.

Korean Registration Determination Certificate dated Nov. 20, 2012 for Korean Patent Application No. KR 10-2011-0036392 which corresponds to captioned U.S. Appl. No. 13/415,247.

Wang et al., "Self-Assembled TiO-Graphene Hybrid Nanostructures for Enhanced Li-Ion Insertion," *ACS Nano*, 2009, 3(4): 907-914.

Chinese Office Action dated Apr. 3, 2015 for Chinese Patent Application No. CN 201210116880.X which shares priority of Korean Patent Application Nos. KR 10-2011-0036392, filed Apr. 19, 2011; KR 10-2011-0036393, filed Apr. 19, 2011; and KR 10-2012-0020984, filed Feb. 29, 2012 with captioned U.S. Appl. No. 13/415,247.

Japanese Office Action dated Feb. 1, 2016 for Japanese Patent Application No. JP 2012-094506 which shares priority of Korean Patent Application Nos. KR 10-2011-0036392, filed Apr. 19, 2011; KR 10-2011-0036393, filed Apr. 19, 2011; and KR 10-2012-0020984, filed Feb. 29, 2012 with subject U.S. Appl. No. 13/415,247.

ANODE ACTIVE MATERIAL, ANODE AND LITHIUM BATTERY INCLUDING THE MATERIAL, AND METHOD OF PREPARING THE MATERIAL

CROSS-REFERENCE TO RELATED APPLICATIONS

This application claims the benefit of Korean Patent Application No. 10-2011-0036393, filed on Apr. 19, 2011, Korean Patent Application No. 10-2011-0036392, filed on Apr. 19, 2011, and Korean Patent Application No. 10-2012-0020984, filed on Feb. 29, 2012, in the Korean Intellectual Property Office, the disclosures of which are incorporated herein in their entirety by reference.

BACKGROUND

1. Field

One or more embodiments relate to an anode active material, an anode and a lithium battery including the anode active material, and a method of preparing the anode active material.

2. Description of the Related Technology

Lithium batteries are used in various applications due to their high voltage and high energy density characteristics. For example, because a large amount of electricity has to be charged or discharged and a prolonged operation is also necessary in the field of electric vehicles such as hybrid electric vehicles (HEVs), plug-in hybrid electric vehicles (PHEVs), a lithium battery having a high capacity, high rate characteristics, and excellent life characteristics is in demand.

The capacity of a battery using a carbon-based material is generally low due to a porous structure of carbon. For example, a theoretical capacity of graphite having high crystallinity is about 372 mAh/g for a $LiC_6$ composition. Also, high rate characteristics of the carbon-based material are poor.

A metal that forms an alloy with lithium may be used as an anode active material having a high capacity in comparison to the carbon-based material. For example, metals that form an alloy with lithium are Si, Sn, Al, etc. However, metals that form alloys with lithium easily deteriorate and thus life characteristics are poor. For example, in the case of Sn, Sn particles are electrically isolated by repeated aggregation and crushing processes during repeated charge and discharge.

Also, thermal runaway may occur in lithium batteries due to a short circuit or the like.

Therefore, a lithium battery having an improved discharging capacity, life characteristics, and thermal stability is in demand.

SUMMARY

One or more embodiments include an anode active material containing a carbon-based material having improved crystallinity and titanium-based oxide.

One or more embodiments include an anode including the anode active material.

One or more embodiments include a lithium battery using the anode.

One or more embodiments include a method of preparing the anode active material.

Additional aspects will be set forth in part in the description which follows and, in part, will be apparent from the description, or may be learned by practice of the presented embodiments.

According to one or more embodiments of the present invention, an anode active material includes a core, wherein the core includes: a crystalline carbon-based material having a lattice spacing $d_{002}$ of about 0.35 nm or more; and titanium-based oxide particles.

According to one or more embodiments, an anode active material includes: a core including a crystalline carbon-based material having a lattice spacing $d_{002}$ of about 0.35 nm or more, titanium-based oxide particles and a metal alloyable with lithium.

According to one or more embodiments, an anode includes an anode active material as disclosed and described herein.

According to one or more embodiments, a lithium battery includes an anode as disclosed and described herein.

According to one or more embodiments, a method of preparing an anode active material includes; preparing a crystalline carbon-based material having a lattice spacing $d_{002}$ of about 0.35 nm or more; and preparing a core including the crystalline carbon-based material and titanium-based oxide particles.

According to one or more embodiments, a method of preparing an anode active material includes; preparing a crystalline carbon-based material having a lattice spacing $d_{002}$ of about 0.35 nm or more; and preparing a core including the crystalline carbon-based material, titanium-based oxide particles, and a metal alloyable with lithium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
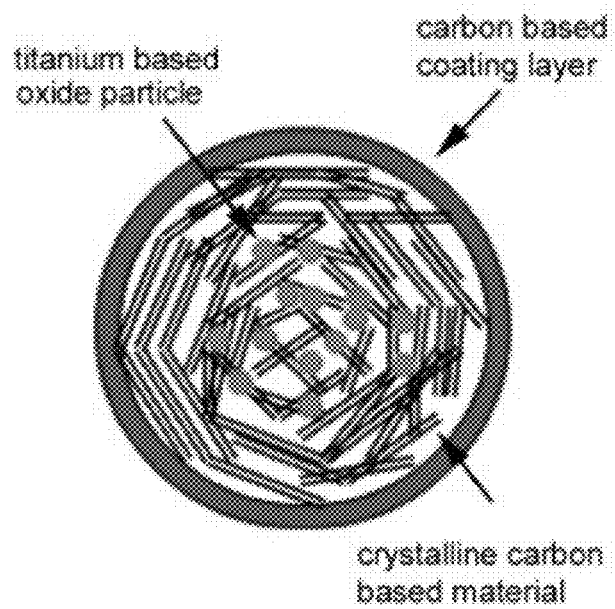
FIG. 1A is a cross-sectional view schematically illustrating anode active material powder according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

An anode including an anode active material according to exemplary embodiments, a lithium battery using the anode, and a method of preparing the anode active material are described hereinafter in more detail.

In some embodiments, an anode active material includes a core containing a crystalline carbon-based material having a lattice spacing $d_{002}$ of 0.35 nm or more and titanium-based oxide particles. In some embodiments, the lattice spacing $d_{002}$ of the crystalline carbon-based material may be in a range of about 0.35 nm to about 0.40 nm. For example, the lattice spacing $d_{002}$ of the crystalline carbon-based material may be in a range of about 0.35 nm to about 0.37 nm.

In some embodiments, the anode active material may have an improved discharge capacity, high rate characteristics, and life characteristics, by including both of the crystalline carbon-based material and titanium-based oxide particles.

In some embodiments, the core including the crystalline carbon-based material and the titanium-based oxide particles may have various types of configurations. For example, the core may have a configuration in which the titanium-based oxide particles are agglomerated in the core and the crystalline carbon-based material coats the agglomerated titanium-based oxide particles. For example, the core may have a configuration illustrated in FIG. 1a. Exposing of the titanium-based oxide particles to the outside of the core may be prevented according to the foregoing configuration. Alternatively, the core may have a configuration in which the titanium-based oxide particles are dispersed overall in the core. That is, the core may have a configuration in which the titanium-based oxide particles are mixed with the crystalline carbon-based material.

In some embodiments, the titanium-based oxide particles and the crystalline carbon-based material may form a composite in the core. Accommodation of a volume change of the anode active material during charging and discharging may be facilitated by forming the composite of the crystalline carbon-based material and the titanium-based oxide particles.

In some embodiments, the content of the titanium-based oxide particles in the anode active material may range from above 0 wt % to about 10 wt % based on a total weight of the core. For example, the content of the titanium-based oxide particles may range from above 0 wt % to about 5 wt % based on the total weight of the core. When the content of the titanium-based oxide particles is too high, the initial capacity may decrease.

In some embodiments, the diameters of the titanium-based oxide particles in the anode active material may be in a range of about 10 nm to about 990 nm. For example, the particle diameter may be in a range of about 200 nm to about 500 nm. When the diameters of the titanium-based oxide particles are too large, the titanium-based oxide particles may be difficult to be included in the core.

In some embodiments, the titanium-based oxide in the anode active material may be one or more selected from the group consisting of $Li_4Ti_5O_{12}$ (LTO), $TiO_2$, $LiTiO_3$, or $Li_2Ti_3O_7$.

In some embodiments, the anode active can include a core including a crystalline carbon-based material having a lattice spacing $d_{002}$ of 0.35 nm or more, titanium-based oxide particles, and a metal alloyable with lithium. That is, the core may further include a metal alloyable with lithium.

In some embodiments, the anode active material may have an improved discharge capacity, life characteristics, and thermal stability, by including the crystalline carbon-based material, the titanium-based oxide particles, and the metal alloyable with lithium at the same time.

In some embodiments, the core including the crystalline carbon-based material, the titanium-based oxide particles, and the metal alloyable with lithium may have various types of configurations. For example, the core may have a configuration in which the titanium-based oxide particles and the metal alloyable with lithium are agglomerated in the core and the crystalline carbon-based material coats the agglomerated titanium-based oxide particles and metal alloyable with lithium. Exposing of the titanium-based oxide particles and the metal alloyable with lithium to the outside of the core may be prevented according to the foregoing configuration. Alternatively, the core may have a configuration in which the titanium-based oxide particles and the metal alloyable with lithium are dispersed overall in the core. That is, the core may have a configuration in which the titanium-based oxide particles and the metal alloyable with lithium are mixed with the crystalline carbon-based material. Deterioration of the metal alloyable with lithium may be prevented according to the foregoing configurations.

In some embodiments, the titanium-based oxide particles and the metal alloyable with lithium may form a composite with the crystalline carbon-based material in the core. Electrical connections during charging and discharging may be maintained despite a volume change of metal particles by forming the composite of the crystalline carbon-based material, the titanium-based oxide particles, and the metal alloyable with lithium.

In some embodiments, the content of the metal alloyable with lithium in the anode active material may range from above 0 wt % to about 20 wt % based on a total weight of the core. For example, the content may range from above 0 wt % to about 10 wt % based on the total weight of the core. When the content of the metal alloyable with lithium is too high, cracks in the anode active material may be generated by means of a volume change of the metal during charging and discharging.

In some embodiments, the metal alloyable with lithium in the anode active material may be composed of particles having a diameter range of about 10 nm to about 990 nm. For example, the diameters of the particles may be in a range of about 100 nm to about 900 nm. For example, the diameters of the particles may be in a range of about 200 nm to about 500 nm. When the particle diameter of the metal alloyable with lithium is too small, surfaces of the metal particles may be easily oxidized. When the particle diameter of the metal alloyable with lithium is too large, cracks in the anode active material may be generated by means of a volume change of the metal during charging and discharging.

In some embodiments, the metal alloyable with lithium in the anode active material may be one or more selected from the group consisting of Si, Sn, Pb, Ge, Al or oxides of the preceding metals.

In some embodiments, the metal alloyable with lithium in the anode active material may form a coating layer on a surface of the crystalline carbon-based material. The coating layer may be formed by reducing a precursor of the metal alloyable with lithium. The coating layer may be coated to a thickness of about 1 nm to about 100 nm on the surface of the crystalline carbon-based material.

In some embodiments, the deterioration of the metal alloyable with lithium during charging and discharging may be prevented by allowing the metal alloyable with lithium to form a coating layer on the surface of the crystalline carbon-based material. For example, even if cracks are generated on a surface of the coating layer, the coating layer may maintain an electrically connected state with the crystalline carbon-based material until the coating layer is completely separated.

In some embodiments, the crystalline carbon-based material in the anode active material can have a structure in which n-polycyclic nano-sheets, in which rings composed of 6 carbon atoms connected in a hexagonal shape are fused to one another and arranged on one plane, are stacked along a direction perpendicular to the one plane, wherein n is an integer from 2 to 250. When a first carbon among carbons of the n-polycyclic nano-sheets and a second carbon among carbons of the n-polycyclic nano-sheets are selected to satisfy a condition, $L1 \geq L2$ (where L1 denotes a distance between the first carbon and the second carbon, and L2 denotes a distance between an arbitrary third carbon, among carbons of the n-polycyclic nano-sheets excluding the first and second carbons, and an arbitrary fourth carbon among carbons of the n-polycyclic nano-sheets excluding the first, second, and third carbons), and the first carbon is positioned at the origin A (0, 0, 0) of a three-dimensional coordinate system having x-, y-, and z-axes, the second carbon has a coordinate B (p, q, r), where p and q are independent from each other and about 10 μm or less, and r is about 100 nm or less.

Particularly, although the crystalline carbon-based material may have an irregular shape, it basically has a "plate" shape. Although the shape of the crystalline carbon-based material is basically a "plate" shape, the carbon-based material may have various modified shapes such as a bent shape or a shape having a curled end portion. The fact that the shape of the crystalline carbon-based material is basically a "plate" shape may be easily understood from a micrograph of the crystalline carbon-based material in FIG. 3A.

In some embodiments, the crystalline carbon-based material has a structure in which n-polycyclic nano-sheets, in which rings composed of 6 carbon atoms connected in a hexagonal shape are fused to one another and arranged on one plane, are stacked along a direction perpendicular to the one plane.

The phrase "a ring composed of 6 carbon atoms connected in a hexagonal shape" in the present specification denotes a hexagonal ring in which carbons are positioned at each vertex of the hexagon. Hereinafter, the phrase is stated as a "6-membered carbon ring". A polycyclic nano-sheet has a plurality of 6-membered carbon rings, which are fused together to form a honeycomb shape and arranged on one plane. Herein, the phrase "arranged on one plane" denotes that the plurality of 6-membered carbon rings are fused right and left to be arranged and extended, and the phrase excludes the plurality of the 6-membered carbon rings fused above and below to be arranged and extended.

Adjacent carbons among the carbons of the polycyclic nano-sheets may be connected by $sp^2$ bonds to each other. Therefore, because a resonance structure may be formed in the 6-membered carbon rings, electron transfer may be further facilitated.

Because the polycyclic nano-sheet has a structure in which the plurality of 6-membered carbon rings are arranged on one plane by being fused to one another, a thickness of the polycyclic nano-sheet, for example, may be in a range of a carbon atom diameter ±0.1 nm. Herein, the fact that the thickness of the polycyclic nano-sheet is in a range of a carbon atom diameter "±0.1 nm" reflects that the polycyclic nano-sheet may have a bent shape or a shape having a curled end portion and may be partially damaged.

In some embodiments, the crystalline carbon-based material has a structure in which the foregoing n-polycyclic nano-sheets are stacked. Herein, the n-polycyclic nano-sheets are stacked along a direction perpendicular to one plane where the plurality of 6-membered carbon rings of the polycyclic nano-sheets are arranged by being fused together.

In some embodiments, n may be an integer between about 2 and about 100, for example, between about 2 and about 80, for example, between about 2 and about 70, and for example, between about 2 and about 40. In some embodiments, n may be between about 2 and about 20, and for example, between about 2 and about 10.

In the crystalline carbon-based material, when a first carbon among carbons of the n-polycyclic nano-sheets and a second carbon among carbons of the n-polycyclic nano-sheets are selected to satisfy a condition, $L1 \geq L2$, and the first carbon is positioned at the origin A (0, 0, 0) of a three-dimensional coordinate system having x-, y-, and z-axes, the second carbon has a coordinate B (p, q, r), where p and q are independent from each other and about 10 μm or less, and r may be about 100 nm or less. L1 denotes a distance between the first carbon and the second carbon, and L2 denotes a distance between an arbitrary third carbon, among carbons of the n-polycyclic nano-sheets excluding the first and second carbons, and an arbitrary fourth carbon among carbons of the n-polycyclic nano-sheets excluding the first, second, and third carbons. That is, it may be understood that the first carbon and the second carbon are two carbons selected to have the longest distance between carbons among the carbons included in the n-polycyclic nano-sheets.

In some embodiments, p and q are independent from each other and may be about 10 μm or less, and for example, in a range of about 0.1 μm to about 10 μm. For example, p and q may be in a range of about 1 μm to about 10 μm. In some embodiments, p and q may be width and length, respectively, in directions perpendicular to a thickness direction of the crystalline carbon-based material.

In some embodiments, r may be about 100 nm or less, and for example, in a range of about 0.5 μm to about 100 nm. In some embodiments, r may be in a range of about 0.5 μm to about 90 nm, and for example, in a range of about 0.5 μm to about 50 nm. For example, r may be about 0.5 μm to about 20 nm, but r is not limited thereto. In some embodiments, r may be a length in a thickness direction of the crystalline carbon-based material. For example, the crystalline carbon-based material may be nanopowder having a plate shape.

Because p, q, and r of the crystalline carbon-based material satisfies the foregoing ranges, transfer of electrons or the like is facilitated to thus obtain excellent conductivity, although the transfer is not limited to a particular theory.

A carbon-based coating layer is further formed on the core in the anode active material as shown in FIG. 1A. In some embodiments, the carbon-based coating layer may include amorphous carbon. In some embodiments, a contact between the carbon-based material and an electrolyte may be prevented by the formation of a solid electrolyte interface (SEI) and the selective permeation of Li ions due to the formation of the carbon-based coating layer on the core.

In some embodiments, the anode active material may be composed of spherical particles having an aspect ratio less than about 2. For example, the anode active material may be composed of spherical particles having an aspect ratio range of about 1 to about 2, and for example, about 1 to about 1.5. Flexibility during preparation of slurry and electrode plates may be obtained because the anode active material has a spherical shape.

In some embodiments, an average diameter of the spherical particles may be in a range of about 1 μm to about 100 μm. For example, the average diameter may be in a range of about 3 μm to about 60 μm. When the average diameter of the spherical particles is too small, the preparation of the slurry may be difficult due to an increase in a specific surface area, and coating may be non-uniform or high rate characteristics may deteriorate when the average diameter of the spherical particles is too large.

That the anode active material is composed of spherical particles and an average diameter is in a range of about 1 μm to about 100 μm may be confirmed from scanning electron microscope (SEM) micrographs of FIGS. 1B, 1C, 2A, and 2B.

An anode according to an embodiment includes the anode active material. For example, the anode may be prepared by a method in which an anode active material composition containing the anode active material and a binder is formed in a certain shape or the anode active material composition is coated on a current collector such as a copper foil and the like.

Particularly, an anode active material composition, in which the anode active material, a conductive agent, a binder, and a solvent are mixed together, is prepared. A negative plate is prepared by directly coating the anode active material composition on a metal current collector. Alternatively, the anode active material composition is casted on a separate support, and then a negative plate may be prepared by laminating films detached from the support on a metal current collector. The anode is not limited to the foregoing shapes and may have a shape other than the foregoing shapes.

Examples of the conductive agent may be acetylene black, Ketjen black, natural graphite, artificial graphite, carbon black, acetylene black, carbon fibers, metal powders such as copper, nickel, aluminium, or silver, metal fibers, etc. In some embodiments, the conductive agent may be used by mixing one or more conductive materials such as a polyphenylene derivative. However, the conductive agent is not limited thereto and any conductive agent may be used as long as it is used in the art. Further, the foregoing crystalline carbon-based material may be included as a conductive agent.

Examples of the binder may be vinylidene fluoride/hexafluoropropylene copolymer, polyvinylidene fluoride (PVDF), polyacrylonitrile, poly(methyl methacrylate), polytetrafluoroethylene, and mixtures thereof, or styrene butadiene rubber-based polymer, etc. However, the binder is not limited thereto and any binder may be used that is known in the art.

Examples of the solvent may be N-methylpyrrolidone, acetone, water, etc. However, the solvent is not limited thereto and any solvent may be used that is known in the art.

Contents of the anode active material, conductive agent, binder, and solvent are at amounts typically used in a lithium battery. One or more of the conductive agent, binder, and solvent may be omitted according to applications and configurations of lithium batteries.

A lithium battery according to an embodiment may use an anode including the anode active material. The lithium battery may be prepared according to the following method.

First, an anode is prepared according to a method of preparing the anode.

Next, a cathode active material composition, in which a cathode active material, a conductive agent, a binder and a solvent are mixed together, is prepared. The cathode active material composition is directly coated on a metal current collector and dried to prepare a positive plate. Alternatively, the cathode active material composition is casted on a separate support and then a positive plate may be prepared by laminating films detached from the support on a metal current collector.

The cathode active material may include one or more selected from the group consisting of lithium cobalt oxide, lithium nickel cobalt manganese oxide, lithium nickel cobalt aluminum oxide, lithium iron phosphate, or lithium manganese oxide. However, the cathode active material is not limited thereto and any cathode active material may be used as long as it is used in the art.

For example, a compound expressed as one of the following chemical formulas may be used: $Li_aA_{1-b}B_bL_2$ (where $0.90 \leq a \leq 1.8$, $0 \leq b \leq 0.5$); $Li_aE_{1-b}B_bO_{2-c}L_c$ (where $0.90 \leq a \leq 1.8$, $0 \leq b \leq 0.5$, $0 \leq c \leq 0.05$); $LiE_{2-b}B_bO_{4-c}D_c$ (where $0 \leq b \leq 0.5$, $0 \leq c \leq 0.05$); $Li_aN_{1-b-c}Co_bB_cL_\alpha$ (where $0.90 \leq a \leq 1.8$, $0 \leq b \leq 0.5$, $0 \leq c \leq 0.05$, $0 \leq \alpha \leq 2$); $Li_aNi_{1-b-c}Co_bB_cO_{2-\alpha}Z_\alpha$ (where $0.90 \leq a \leq 1.8$, $0 \leq b \leq 0.5$, $0 \leq c \leq 0.05$, $0 \leq \alpha \leq 2$); $Li_aNi_{1-b-c}Co_bB_cO_{2-\alpha}Z_2$ (where $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cL_\alpha$ (where $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cO_{2-\alpha}Z_\alpha$ (where $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cO_{2-\alpha}Z_2$ (where $0.90 \leq a \leq 1.8$, $0 \leq b \leq 0.5$, $0 \leq c \leq 0.05$, $0 \leq \alpha \leq 2$); $Li_aNi_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMnG_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn, or a combination thereof; B is Al, Ni, Co, Mn, Cr, Fe, Mg, Sr, V, rare earth elements, or a combination thereof; L is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; J is V, Cr, Mn, Co, Ni, Cu, or a combination thereof.

In some embodiments, a compound having a coating layer on the foregoing compounds may be used, or a compound may be used by mixing the foregoing compounds and the compound having a coating layer. In some embodiments, the coating layer may include a compound of a coating element such as oxide, hydroxide, oxyhydroxide, oxycarbonate, or hydroxycarbonate of a coating element. In some embodiments, the compound constituting the coating layer may be amorphous or crystalline. Examples of the coating element included in the coating layer may be Mg, Al, Co, K, Na, Ca, Si, Ti, V, Sn, Ge, Ga, B, As, Zr, and combinations thereof. Any coating method may be used for a process of forming a coating layer as long as coating may be performed by a method (e.g., spray coating, dipping, etc.) that does not adversely affect the physical properties of the cathode active material due to using such coating elements on the foregoing compounds. Detailed description related to the coating method is not provided because it is obvious to those skilled in the art.

Examples of the cathode active material may be $LiNiO_2$, $LiCoO_2$, $LiMn_xO_{2x}$ (x=1, 2), $LiNi_{1-x}Mn_xO_2$ ($0 \leq x \leq 1$), $LiNi_{1-x-y}Co_xMn_yO_2$ ($0 \leq x \leq 0.5$, $0 \leq y \leq 0.5$); $LiFePO_4$, $V_2O_5$, TiS, MoS, etc.

In some embodiments, the conductive agent, binder, and solvent in the cathode active material composition may be used the same as those in the anode active material composition. In some embodiments, the pores in an electrode plate may be formed by further adding a plasticizer to the cathode active material composition and/or anode active material composition.

Contents of the cathode active material, conductive agent, binder, and solvent are at amounts typically used in a lithium battery. One or more of the conductive agent, binder, and solvent may be omitted according to applications and configurations of lithium batteries.

Next, a separator, which will be inserted between the cathode and the anode, is prepared. Any separator that is typically used in a lithium battery may be used as the separator. A separator having high moisture-retention ability for an electrolyte as well as low resistance to the transfer of electrolyte ions may be used. Examples of the separator may be one selected from the group consisting of glass fibers, polyester, Teflon, polyethylene, polypropylene, polytetrafluoroethylene (PTFE), and combinations thereof. The separator may be a nonwoven or woven fabric type. For example, a windable separator such as polyethylene or polypropylene is used in a lithium-ion battery, and a separator having high moisture-retention ability for an organic electrolyte may be used in a lithium-ion polymer battery. For example, the separator may be prepared according to the following method.

A separator composition is prepared by mixing a polymer resin, filler, and solvent. The separator composition is directly coated on an upper portion of an electrode and dried to prepare a separator. Also, the separator composition is casted and dried on a support, and then a separator may be prepared by laminating separator films detached from the support on an upper portion of an electrode.

A polymer resin used in the preparation of the separator is not limited thereto and any material used in a binder for an electrode plate may be used. Examples of the polymer resin may be vinylidene fluoride/hexafluoropropylene copolymer, PVDF, polyacrylonitrile, poly(methyl methacrylate), and mixtures thereof.

Next, an electrolyte is prepared.

For example, the electrolyte may be an organic electrolyte. Also, the electrolyte may be a solid. For example, the electrolyte may be boron oxide, lithium oxynitride, etc. However, the electrolyte is not limited thereto and any electrolyte that is used in the art may be used. The solid electrolyte may be formed on the anode by using a method such as sputtering.

In some embodiments, the organic electrolyte may be prepared by dissolving a lithium salt in an organic solvent.

Any organic solvent may be used that is known in the art. Examples of the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and mixtures thereof.

Any lithium salt may be used that is known in the art. Examples of the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(SO_2C_xF_{2x+1})(SO_2C_yF_{2y+1})$ (where x and y are natural numbers of 1 to 20, respectively), LiCl, LiI, and mixtures thereof.

Figure 8:
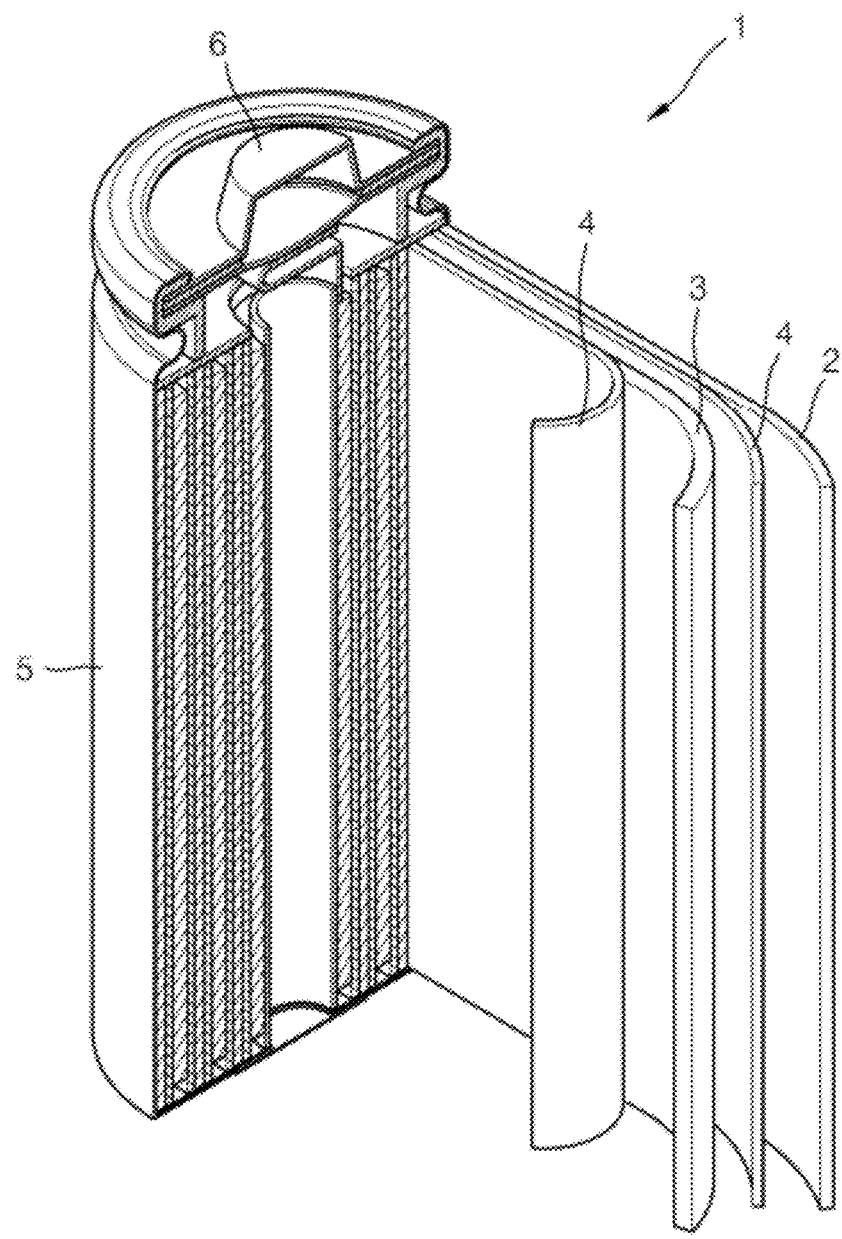
FIG. 8 is a schematic diagram of a lithium battery according to an exemplary embodiment.

As shown in FIG. 8, a lithium battery 1 includes a cathode 3, an anode 2, and a separator 4. The cathode 3, anode 2, and separator 4 are wound and folded to be contained in a battery case 5. Subsequently, an organic electrolyte solution is injected into the battery case 5 and the lithium battery 1 is completed by being sealed with a cap assembly 6. The battery case 5 may be a cylindrical, rectangular, or thin-film type. For example, the lithium battery 1 may be a thin-film type battery. In some embodiments, the lithium battery 1 may be a lithium-ion battery.

A separator is disposed between the cathode and the anode such that a battery structure may be formed. The battery structure is stacked in a bi-cell structure, and then impregnated in an organic electrolyte solution. A lithium-ion polymer battery is completed when a product thus obtained is contained in a pouch and sealed.

Also, battery structures are stacked to form a battery pack, and the battery pack may be used in all devices demanding high capacity and high power. For example, the battery pack may be used in a notebook, smartphone, or electric vehicle (EV).

Particularly, because the lithium battery has excellent high-rate and life characteristics, it is appropriate for an EV. For example, the lithium battery is appropriate for a hybrid vehicle (HV) such as a plug-in hybrid electric vehicle (PHEV).

Some embodiments provide a method of preparing an anode active material, comprising: preparing a crystalline carbon-based material having a lattice spacing $d_{200}$ of about 0.35 nm or more; and preparing a core including the crystalline carbon-based material and titanium-based oxide particles.

Some embodiments provide a method of preparing an anode active material, comprising: preparing a crystalline carbon-based material having a lattice spacing $d_{200}$ of about 0.35 nm or more; and preparing a core including the crystalline carbon-based material, titanium-based oxide particles, and a metal alloyable with lithium. That is, the core may further include a metal alloyable with lithium.

In some embodiments, the preparing of the crystalline carbon-based material may include an operation of heat treating expandable graphite at a temperature range of about 300° C. to about 700° C. for about 0.1 hours to about 5 hours. The heat treatment temperature, for example, may be in a range of about 400° C. to about 600° C., and for example, may be in a range of about 450° C. to about 550° C. The heat treatment time may be in a range of about 0.5 hours to about 3 hours, and for example, may be in a range of about 0.5 hours to about 2 hours.

In some embodiments, the expandable graphite may be obtained by dipping natural graphite, artificial graphite, carbon fibers, or spheroidal graphite in a strong acid solution such as sulfuric acid or hydrochloric acid for about 1 hour to about 24 hours. However, a method of preparing the expandable graphite is not always limited thereto and any method enabling to prepare expandable graphite may be used.

In some embodiments, the preparing of the core may include: preparing a mixture by mixing the crystalline carbon-based material and the titanium-based oxide particles in a solution; and drying and spheroidizing the mixture. For example, the titanium-based particles may be nanoparticles or microparticles.

Also, the preparing of the core may include: preparing a mixture by mixing the crystalline carbon-based material, the titanium-based oxide particles, and the metal particles alloyable with lithium in a solution; and drying and spheroidizing the mixture. That is, the mixture may further include a precursor of a metal alloyable with lithium.

Alternatively, the preparing of the core may include: preparing a heat treatment product by mixing, drying, and heat treating the crystalline carbon-based material and a precursor solution of a metal alloyable with lithium; preparing a mixture by mixing the heat treatment product with titanium-based oxide particles in a solution; and drying and spheroidizing the mixture. A coating layer containing a metal alloyable with lithium may be formed on a surface of the crystalline carbon-based material while the precursor is reduced by mixing, drying, and heat treating the crystalline carbon-based material and the precursor solution of a metal alloyable with lithium.

In the foregoing method of preparing the anode active material, the precursor of a metal may be one or more selected from the group consisting of $SiCl_4$, $SiH_2Cl_2$, $SnCl_4$, $PbCl_4$, or $GeCl_4$. However, the precursor of a metal is not always limited thereto and any precursor of a metal may be used that is known in the art.

In some embodiments, the method of preparing the anode active material may further include forming a carbon-based coating layer by coating and sintering a carbon precursor on the core.

In some embodiments, a thickness of the carbon-based coating layer may be in a range of about 10 nm to about 100 nm. When the thickness of the carbon-based coating layer is too thin, an uncoated portion may exist such that a core may be exposed to an electrolyte solution. When the thickness of the carbon-based coating layer is too thick, high rate characteristics may deteriorate because the transfer of lithium ions is not facilitated.

In some embodiments, the carbon precursor may be one or more selected from the group consisting of polymer, coal tar pitch, petroleum pitch, meso-phase pitch, coke, low molecular weight intermediate oil, coal-based pitch, or a derivative thereof. Sintering of the carbon precursor may be performed at a temperature range of about 800° C. to about 1200° C. for about 0.1 hours to about 10 hours.

The present embodiments are described in more detail according to Examples and Comparative Examples below. The following examples are for illustrative purposes only and are not intended to limit the scope of the one or more embodiments.

PREPARATION OF CRYSTALLINE
CARBON-BASED MATERIAL

Preparation Example 1

About 100 g of expandable graphite was expanded by heating at a sintering temperature of about 500° C. for about 1 hour, and then the gas generated therefrom was exhausted through an exhaust outlet of an oven. A product thus obtained was dispersed in ethanol and ground by using a homogenizer at about 10,000 rpm for about 10 minutes. A mixture thus obtained was further ground by using a micro fluidizer, and then cleaned with ethanol after filtering using a filtering apparatus. Crystalline carbon-based material powder was obtained by drying the filtered mixture in an oven at about 120° C.

Figure 3A:
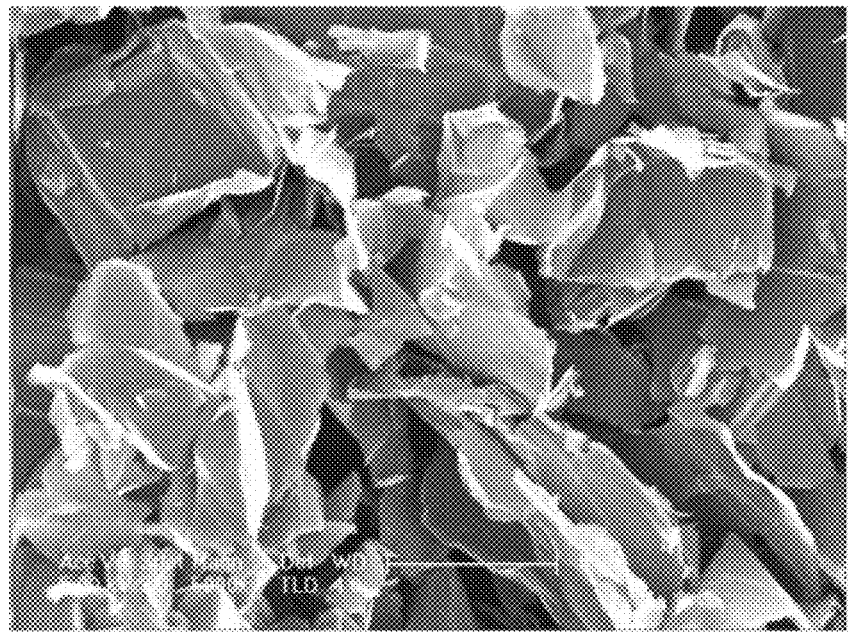
FIG. 3A is a SEM image showing a crystalline carbon-based material prepared in Preparation Example 1.

A micrograph of the crystalline carbon-based material powder observed by an SEM is shown in FIG. 3A. That individual crystalline carbon-based material nanoparticles included in the crystalline carbon-based material nanopowder have basically a "plate" shape may be confirmed from the SEM image of FIG. 3A.

Figure 3B:
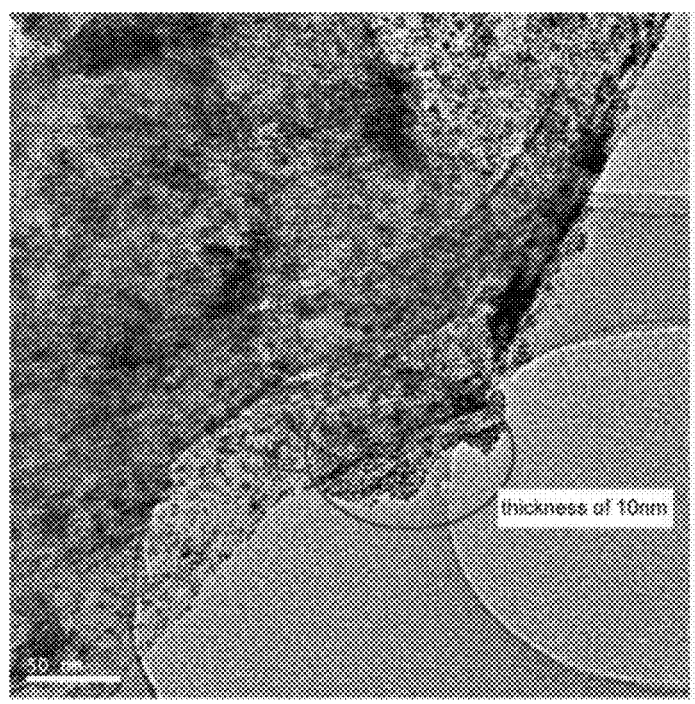
FIG. 3B is a transmission electron microscope (TEM) image showing the crystalline carbon-based material prepared in Preparation Example 1.

A micrograph of nanoparticles in the crystalline carbon-based material powder observed by a TEM is shown in FIG. 3B. A portion marked in a dotted circle, for example, is a portion corresponding to a side of the crystalline carbon-based material nanoparticles in FIG. 3A and that the thickness thereof is about 10 nm may be confirmed from FIG. 3A. Therefore, that the crystalline carbon-based material nanoparticle has r of about 10 nm (see the description related to the definition of "r" in the detailed description) may be confirmed from FIG. 3B.

A size distribution of nanoparticles included in the crystalline carbon-based nanopowder was evaluated by using a Hydro 2000 of Melvern. Components of a direction corresponding to p or q of the crystalline carbon-based material nanopowder (see the description related to the definitions of "p" and "q" in the detailed description) may be confirmed that $d_{10}$ is about 2.1 µm, $d_{50}$ is about 4.11 µm, and $d_{90}$ is about 7.16 µm.

Preparation Example 2

Except for changing the sintering temperature to about 400° C., crystalline carbon-based material nanopowder was prepared using the same method as described in Preparation Example 1.

Preparation Example 3

Except for changing the sintering temperature to about 300° C., crystalline carbon-based material nanopowder was prepared using the same method as described in Preparation Example 1.

Preparation Example 4

Except for changing the sintering temperature to about 200° C., crystalline carbon-based material nanopowder was prepared using the same method as described in Preparation Example 1.

Preparation Example 5

Except for changing the sintering temperature to about 150° C., crystalline carbon-based material nanopowder was prepared using the same method as described in Preparation Example 1.

Preparation Example 6

Except for applying a thermal shock at a sintering temperature of about 1000° C. for about 30 seconds, crystalline carbon-based material nanopowder was prepared using the same method as described in Preparation Example 1.

Preparation of Anode Active Material

Example 1

95 parts by weight of the crystalline carbon-based material nanoparticles prepared in Preparation Example 1 and 5 parts by weight of LTO ($Li_4Ti_5O_{12}$) nanoparticles having an average particle diameter of about 300 nm were added to 200 parts by weight of an ethanol solvent and stirred to prepare a mixture solution. The mixture solution was dried, and then core powder was prepared by spheroidizing the dried product with a hybridization system.

20 parts by weight of meso-phase pitch was mixed with respect to 100 parts by weight of the core powder, and then anode active material powder was prepared by forming a carbon-based coating layer on the core powder through mechanical milling and heat treating at about 900° C. for about 1 hour.

Figure 1B:
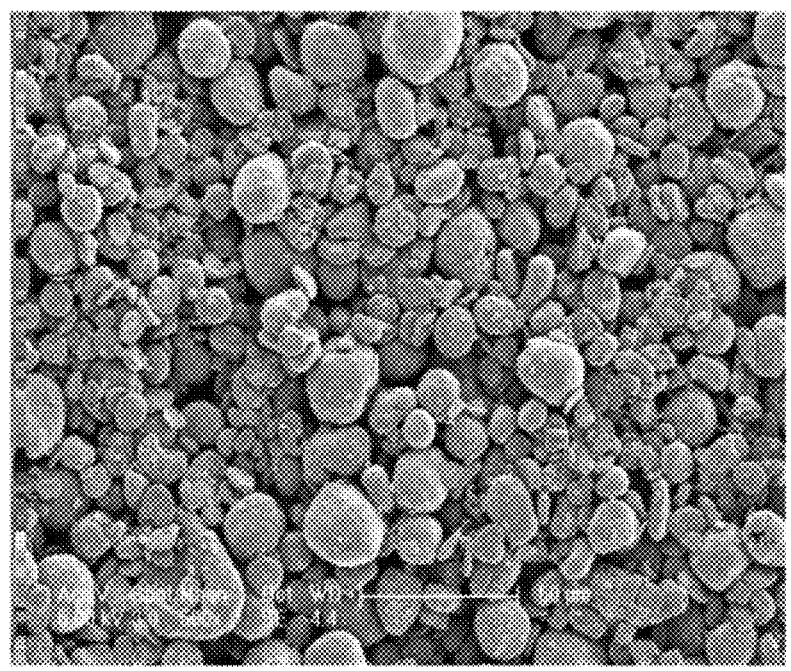
FIG. 1B is a scanning electron microscope (SEM) image showing anode active material powder prepared in Example 1.
Figure 1C:
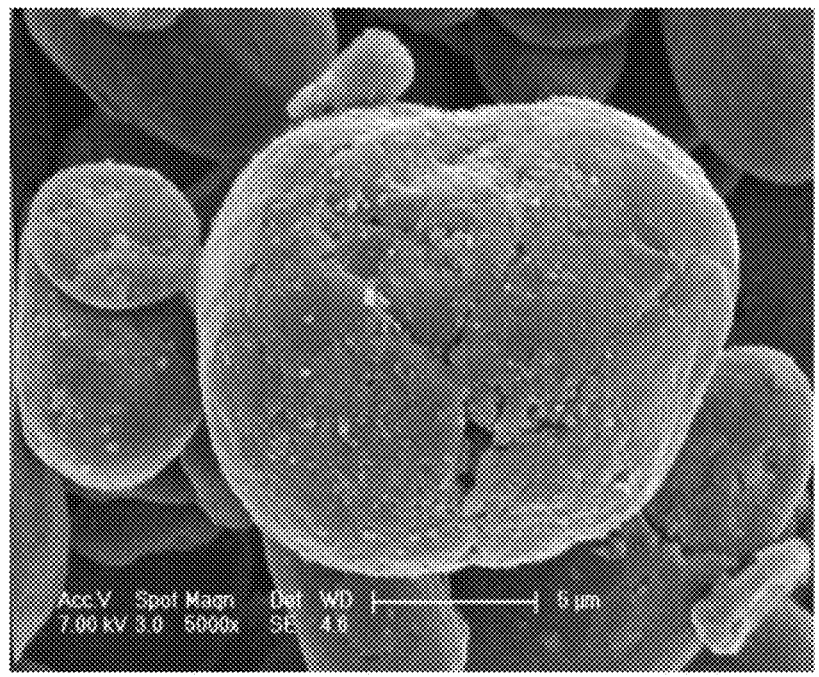
FIG. 1C is a SEM image showing anode active material particles prepared in Example 1.

SEM micrographs of the anode active material powder prepared in Example 1 are shown in FIGS. 1B and 1C. An aspect ratio of the anode active material powder was in a range of about 1 to about 1.5, and an average particle diameter was about 20 μm.

Examples 2 to 6

Except for using the crystalline carbon-based material nanopowders prepared in Preparation Examples 2 to 6, anode active materials were prepared using the same method as described in Example 1.

Comparative Example 1

20 parts by weight of meso-phase pitch was mixed with respect to 100 parts by weight of natural graphite powder, and then anode active material powder having a carbon-based coating layer formed on a natural graphite core was prepared by mechanical milling and heat treating at about 900° C. for about 1 hour.

Comparative Example 2

100 parts by weight of the crystalline carbon-based material nanopowder prepared in Preparation Example 1 was spheroidized by using a hybridization system to prepare anode active material powder composed of only cores.

Comparative Example 3

Except for using 80 parts by weight of the crystalline carbon-based material nanoparticles prepared in Preparation Example 1 and 20 parts by weight of LTO ($Li_4Ti_5O_{12}$) nanoparticles having an average particle diameter of about 300 nm, anode active material was prepared using the same method as described in Example 1.

Preparation of Anode and Lithium Battery

Example 7

A slurry was prepared to obtain a weight ratio of anode active material: binder of 94:6 by adding the anode active material powder synthesized in Example 1 and PVDF binder solution.

The anode active material slurry was coated on an aluminum foil having a thickness of about 10 μm and then dried to prepare a positive plate. A coin cell (CR2016 type) having a diameter of about 16 mm was prepared by performing additional vacuum drying.

Metallic lithium was used as a counter electrode during preparation of the coin cell, and a polypropylene separator (Celgard® 3510, Celgard, LLC, Charlotte, N.C.) was used as a separator. An electrolyte used was prepared by dissolving 1.3 M $LiPF_6$ in a solvent mixture of ethylene carbonate (EC): diethyl carbonate (DEC) (a volume ratio of 3:7).

Examples 8 to 12

Except for using the respective anode active material powders synthesized in Examples 2 to 6, lithium batteries were prepared using the same method as described in Example 7.

Comparative Examples 4 to 6

Except for using the anode active material powders synthesized in Comparative Examples 1 to 3, lithium batteries were prepared using the same method as described in Example 7.

Evaluaton Example 1

X-ray Diffraction (XRD) Experiment

XRD experiments were performed on the anode active material powders prepared in Examples 1 to 6. CuKα characteristic X-ray having a wavelength of 1.541 Å was used for the XRD experiments.

Figure 4:
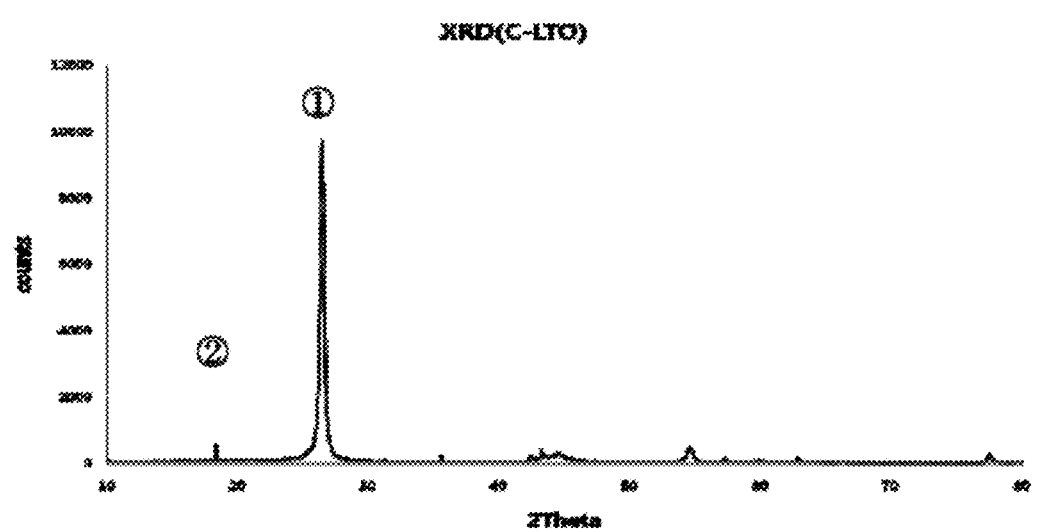
FIG. 4 is a X-ray diffraction (XRD) spectrum of the anode active material powder prepared in Example 1.

As shown in FIG. 4, the anode active material particles of Example 1 showed a characteristic peak corresponding to crystalline carbon at ① and a characteristic peak corresponding to LTO at ②, respectively.

The following Table 1 presents lattice spacings calculated from peaks corresponding to crystalline carbons included in the anode active materials of Examples 1 to 6.

TABLE 1

| | Lattice Spacing ($d_{002}$) [nm] |
|---|---|
| Example 1 | 0.38 |
| Example 2 | 0.37 |
| Example 3 | 0.37 |
| Example 4 | 0.36 |
| Example 5 | 0.35 |
| Example 6 | 0.38 |

As shown in Table 1, the lattice spacings of the crystalline carbon-based materials included in Examples 1 to 6 are in a range of about 0.35 nm to about 0.38 nm and the lattice spacings were more expanded than that of the typical graphite.

Evaluaton Example 2

High-Rate Characteristic Evaluation

Figure 5:
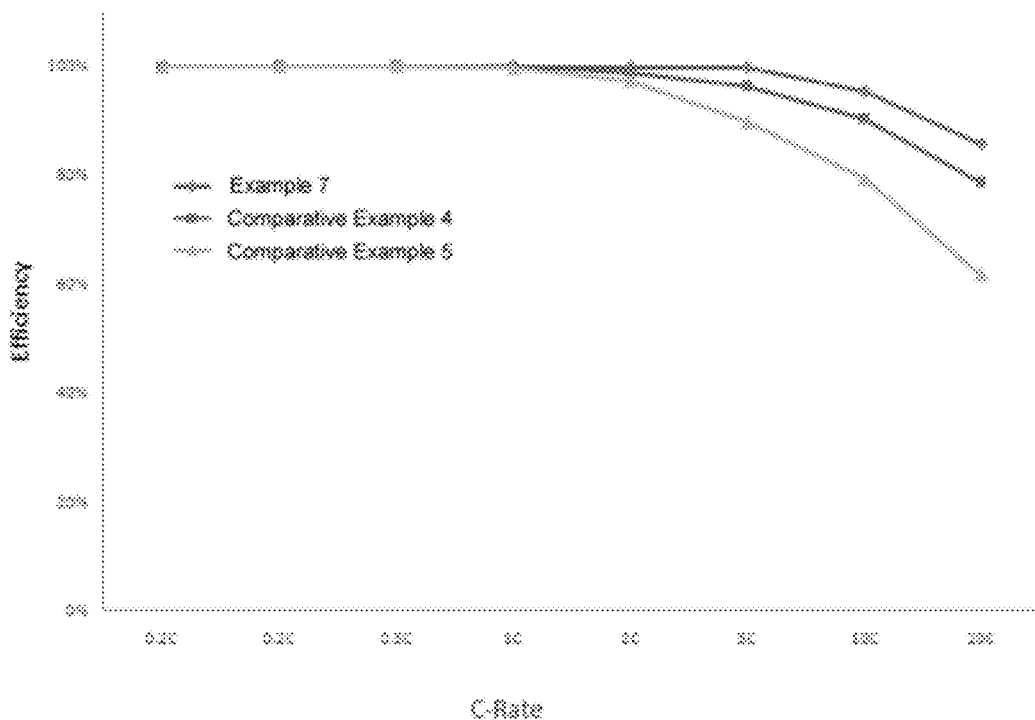
FIG. 5 is a graph showing high rate characteristics of lithium batteries prepared in Example 7 and Comparative Examples 4 and 5.

Discharge capacities were measured according to an increase in current density, at each cycle, during discharging after coin cells prepared in Example 7 and Comparative Examples 4 and 5 were charged at a 0.2 C-rate constant current rate in a voltage range of about 0.01 V to about 1.5 V with respect to lithium metal at room temperature. A charge and discharge efficiency for each rate was calculated from the discharge capacities, as shown in FIG. 5. Current densities during discharging were 0.1 C, 0.2 C, 0.5 C, 1 C, 2 C, 5 C, 10 C, and 20 C rates, respectively. The charge and discharge efficiency for each rate is calculated by the following Mathematical Equation 1.

Charge and discharge efficiency [%]=[discharge capacity/charge capacity]×100  <Mathematical Equation 1>

As shown in FIG. 5, high rate characteristics of the lithium battery of Example 7 were improved in comparison to the lithium batteries of Comparative Examples 4 and 5.

Evaluaton Example 3

Life Characteristic Evaluation

Capacity retention ratios were measured while the coin cells prepared in Examples 7 to 12 and Comparative Examples 4 to 6 were charged and discharged at a 0.5 C-rate constant current rate in a voltage range of about 0.01 V to about 1.5 V with respect to lithium metal at room temperature, and the results thereof are presented in Table 2 below. The capacity retention ratio at room temperature is expressed as Mathematical Equation 2 below.

Capacity retention ratio [%]=(discharge capacity in a $100^{th}$ cycle/discharge capacity in the $1^{st}$ cycle)×100  <Mathematical Equation 2>

TABLE 2

| | Capacity Retention Ratio [%] |
|---|---|
| Example 7 | 93.1% |
| Example 8 | 90.2% |
| Example 9 | 87.7% |
| Example 10 | 84.9% |
| Example 11 | 82.5% |
| Example 12 | 83.3% |
| Comparative Example 4 | 61.0% |
| Comparative Example 5 | 76.6% |
| Comparative Example 6 | 82.9% |

As shown in Table 2, life characteristics of the lithium batteries of Examples 7 to 12 at a high rate were considerably improved in comparison to the lithium batteries of Comparative Examples 4 and 5.

Although the lithium battery of Comparative Example 6 has favorable life characteristics, an initial capacity was low at about 150 mAh/g or less because a large amount of titanium-based oxide particles were included.

Initial discharge capacities of the lithium batteries of Examples 7 to 12 were in a range of about 355 mAh/g to about 365 mAh/g, and were almost similar to 372 mAh/g, which is the maximum theoretical discharge capacity of a perfect graphite crystal.

Preparation of Anode Active Material

Example 13

A mixture was formed by adding 80 parts by weight of the crystalline carbon-based material nanoparticles prepared in Preparation Example 1, 5 parts by weight of LTO nanoparticles having an average particle diameter of about 300 nm, and 15 parts by weight of Si nanoparticles having an average particle diameter of about 300 nm to 200 parts by weight of an ethanol solvent, with stiffing. The solvent was removed from the mixture to afford a dried product, and then core powder was prepared by granulizing and spheroidizing the dried product with a hybridization system. The granulation and spheroidization were performed at a rate range of about 100 m/s to about 150 m/s for about 5 minutes to about 10 minutes.

10 parts by weight of meso-phase pitch was mixed with respect to 100 parts by weight of the core powder, and then anode active material powder was prepared by forming a carbon-based coating layer on the core powder through mechanical milling and heat treating at about 900° C. for about 1 hour.

Figure 2A:
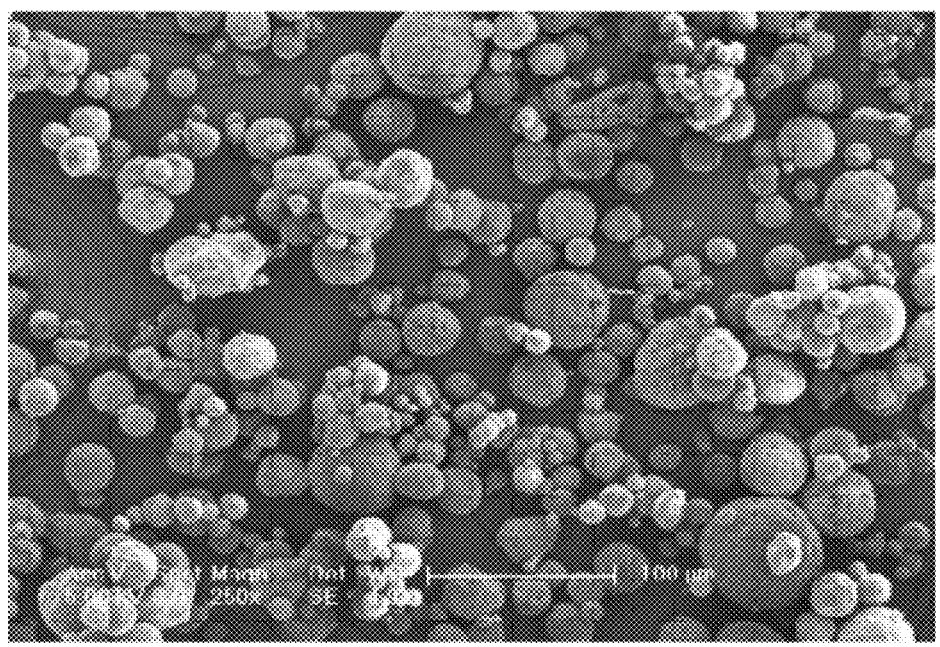
FIG. 2A is a SEM image showing anode active material powder prepared in Example 13.
Figure 2B:
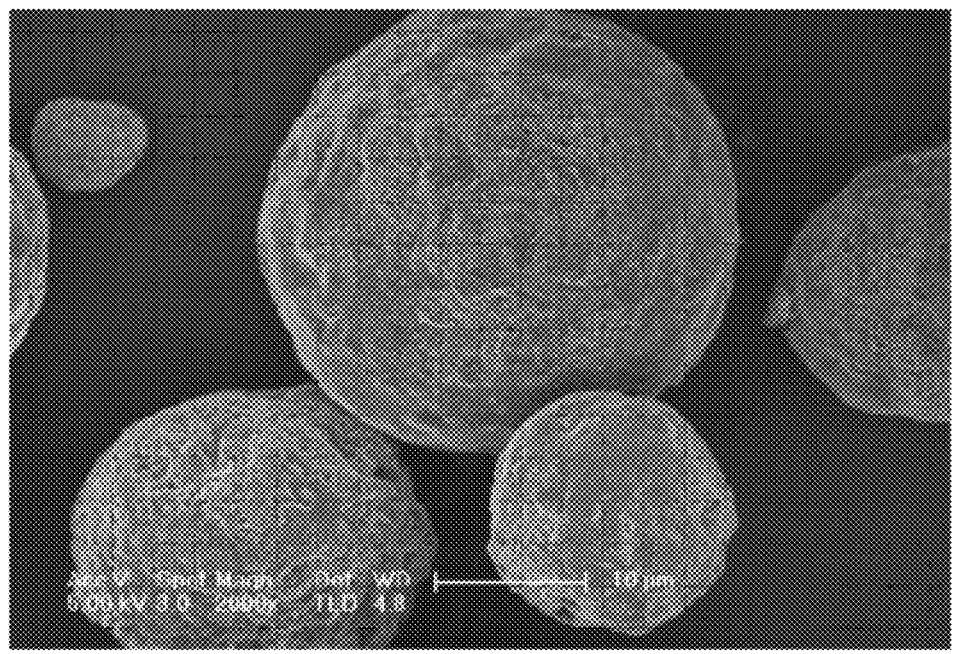
FIG. 2B is a SEM image showing anode active material particles prepared in Example 13.

SEM micrographs of the anode active material powder prepared in the Example 13 are shown in FIGS. 2A and 2B. An aspect ratio of the anode active material powder was in a range of about 1 to about 1.5, and an average particle diameter (d50) was about 20 μm.

Examples 14 to 18

Except for using the crystalline carbon-based material nanopowders prepared in Preparation Examples 2 to 6, anode active material was prepared using the same method as described in Example 13.

Example 19

The crystalline carbon-based material nanopowder prepared in Preparation Example 1 was immersed in a 1.5 M $SiCl_4$ aqueous solution, and then drying and annealing processes at about 300° C. were repeated two or more times. A phase of the annealed powder was stabilized by sintering at about 600° C. for about 2 hours and the stabilized powder was treated by washing and drying processes three times, and then Si was coated on the crystalline carbon-based material nanopowder to a thickness range of about 1 nm to about 10 nm.

95 parts by weight of the Si-coated crystalline carbon-based material nanoparticles and 5 parts by weight of LTO nanoparticles having an average particle diameter (d50) of about 300 nm were added to 200 parts by weight of an ethanol solvent, and stirred to prepare a mixture. The solvent was removed from the mixture to afford a dried product, and then core powder was prepared by granulizing and spheroidizing the dried product with a hybridization system. The granulation and spheroidization were performed at a rate range of about 100 m/s to about 150 m/s for about 5 minutes to about 10 minutes.

10 parts by weight of meso-phase pitch was mixed with respect to 100 parts by weight of the core powder, and then anode active material powder was prepared by forming a carbon-based coating layer on the core powder through mechanical milling and heat treating at about 900° C. for about 1 hour.

An aspect ratio of the anode active material powder was in a range of about 1 to about 1.5, and an average particle diameter (d50) was about 20 μm.

Examples 20 to 24

Except for using the crystalline carbon-based material nanopowders prepared in Preparation Examples 2 to 6, anode active material was prepared using the same method as described in Example 19.

Example 25

A mixture was formed by adding 65 parts by weight of the crystalline carbon-based material nanoparticles prepared in Preparation Example 1, 5 parts by weight of LTO nanoparticles having an average particle diameter of about 300 nm, and 30 parts by weight of SiOx (0<x<2) nanoparticles having an average particle diameter of about 300 nm to 200 parts by weight of an ethanol solvent, with stirring. The solvent was removed from the mixture to afford a dried product, and then core powder was prepared by granulizing and spheroidizing the dried product with a hybridization system. The granulation and spheroidization were performed at a rate range of about 100 m/s to about 150 m/s for about 5 minutes to about 10 minutes.

10 parts by weight of meso-phase pitch was mixed with respect to 100 parts by weight of the core powder, and then anode active material powder was prepared by forming a carbon-based coating layer on the core powder through mechanical milling and heat treating at about 900° C. for about 1 hour.

An aspect ratio of the anode active material powder was in a range of about 1 to about 1.5, and an average particle diameter (d50) was about 20 μm.

Examples 26 to 30

Except for using the crystalline carbon-based material nanopowders prepared in Preparation Examples 2 to 6, anode active material was prepared using the same method as described in Example 25.Comparative Example 7

85 parts by weight of the crystalline carbon-based material nanoparticles prepared in Preparation Example 1 and 15 parts by weight of Si nanoparticles having an average particle diameter (d50) of about 300 nm were added to 200 parts by weight of an ethanol solvent, and stirred to prepare a mixture solution. The mixture solution was dried, and then core powder was prepared by granulizing and spheroidizing the dried product with a hybridization system. The granulation and spheroidization were performed at a rate range of about 100 m/s to about 150 m/s for about 5 minutes to about 10 minutes.

10 parts by weight of meso-phase pitch was mixed with respect to 100 parts by weight of the core powder, and then anode active material powder was prepared by forming a carbon-based coating layer on the core powder through mechanical milling and heat treating at about 900° C. for about 1 hour.

Preparation of Anode and Lithium Battery

Example 31

A slurry was prepared to obtain a weight ratio of anode active material: binder of 94:6 by adding the anode active material powder synthesized in Example 13 and a polyimide (PT) binder solution.

The anode active material was coated on a copper (Cu) foil having a thickness of about 10 μm and then dried to prepare a negative plate. A coin cell (CR2016 type) having a diameter of about 32 mm was prepared by performing additional vacuum drying.

Metallic lithium was used as a counter electrode during preparation of the coin cell, and a polypropylene separator (Celgard® 3510, Celgard, LLC, Charlotte, N.C.) was used as a separator. An electrolyte used was prepared by dissolving 1.3 M LiPF$_6$ in a solvent mixture of ethylene carbonate (EC): diethyl carbonate (DEC) (a volume ratio of 3:7).

Examples 32 to 48

Except for using the respective anode active material powders synthesized in Examples 14 to 24, lithium batteries were prepared using the same method as described in Example 31.

Comparative Example 8

Except for using the anode active material powders synthesized in Comparative Example 7, a lithium battery was prepared using the same method as described in Example 31.

Evaluaton Example 4

XRD Experiment

XRD experiments were performed on the anode active material powders prepared in Examples 13 to 24 and Comparative Example 7. CuKα characteristic X-ray having a wavelength of 1.541 Å was used for the XRD experiments.

Figure 6:
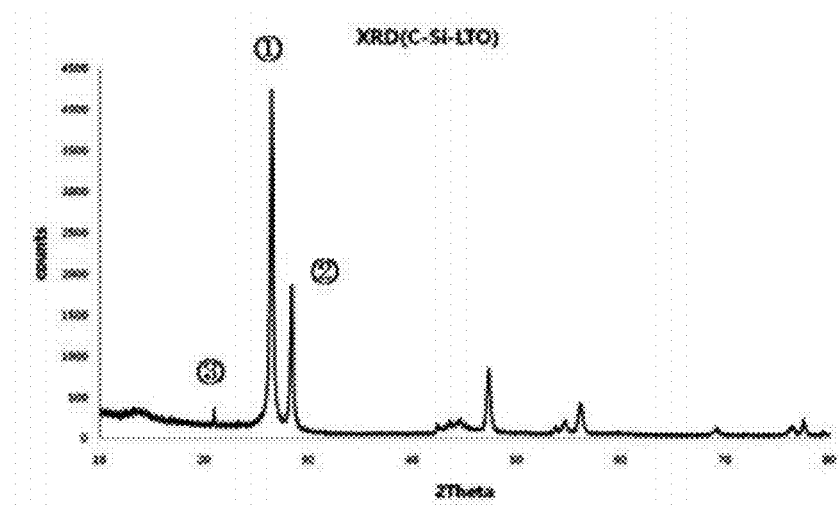
FIG. 6 is a X-ray diffraction (XRD) spectrum of the anode active material powder prepared in Example 13.

As shown in FIG. 6, the anode active material particles of Example 13 showed a characteristic peak corresponding to crystalline carbon at ①, a characteristic peak corresponding to Si at ②, and a characteristic peak corresponding to LTO at ③, respectively.

The following Table 3 presents lattice spacings calculated from peaks corresponding to crystalline carbons included in the anode active materials of Examples 13 to 18.

TABLE 3

|  | Lattice Spacing (d$_{002}$) [nm] |
| --- | --- |
| Example 13 | 0.38 |
| Example 14 | 0.37 |
| Example 15 | 0.37 |
| Example 16 | 0.36 |
| Example 17 | 0.35 |
| Example 18 | 0.38 |

As shown in Table 3, the lattice spacings of the crystalline carbon-based material included in Examples 13 to 18 are in a range of about 0.35 nm to about 0.38 nm and the lattice spacings were more expanded than that of the typical graphite.

Evaluaton Example 5

High-Rate Characteristic Evaluation

Discharge capacities were measured according to an increase in current density, at each cycle, during discharging after the coin cells prepared in Examples 31 to 48 and Comparative Example 8 were charged at a 0.1 C-rate constant current rate in a voltage range of about 0.01 V to about 1.5 V with respect to lithium metal at room temperature. A charge and discharge efficiency for each rate was calculated from the discharge capacities. Current densities during discharging were 0.1 C, 0.2 C, 0.5 C, 1 C, and 2 C rates, respectively. The charge and discharge efficiency at 2 C rate is calculated by the following Mathematical Equation 1, and the results thereof are presented in Table 4.

Charge and discharge efficiency [%]=[discharge capacity at 2 C-rate/charge capacity at 0.1 C-rate]×100        <Mathematical Equation 1>

TABLE 4

|  | Charge and discharge efficiency at 2 C-rate [%] |
| --- | --- |
| Example 31 | 98.1% |
| Example 32 | 96.6% |
| Example 33 | 95.2% |
| Example 34 | 92.3% |
| Example 35 | 91.8% |
| Example 36 | 93.1% |
| Example 37 | 97.4% |
| Example 38 | 94.2% |
| Example 39 | 92.1% |
| Example 40 | 90.7% |
| Example 41 | 89.2% |
| Example 43 | 97.2% |
| Comparative Example 8 | 85.3% |

As shown in Table 4, high rate characteristics of the lithium batteries of Examples 31 to 41 and 43 were considerably improved in comparison to the lithium battery of Comparative Example 8.

Evaluaton Example 6

Life Characteristic Evaluation

Capacity retention ratios were measured while the coin cells prepared in Examples 31 to 41, 43 and Comparative Example 8 were charged and discharged at a 0.5 C-rate constant current rate in a voltage range of about 0.01 V to about 1.5 V with respect to lithium metal at room temperature, and the results thereof are presented in Table 5 below. The capacity retention ratio at room temperature is expressed as Mathematical Equation 2 below.

Capacity retention ratio [%]=(discharge capacity in a 50$^{th}$ cycle/discharge capacity in the 1$^{st}$ cycle)× 100    <Mathematical Equation 2>

TABLE 5

| | Capacity Retention Ratio [%] | Discharge capacity in a 50$^{th}$ cycle [mAh/g] |
|---|---|---|
| Example 31 | 88.3% | 715.2 |
| Example 32 | 85.2% | 690.1 |
| Example 33 | 83.5% | 676.3 |
| Example 34 | 81.5% | 660.1 |
| Example 35 | 79.4% | 643.1 |
| Example 36 | 82.3% | 666.6 |
| Example 37 | 90.1% | 729.8 |
| Example 38 | 87.3% | 707.1 |
| Example 39 | 84.2% | 682.0 |
| Example 40 | 82.5% | 668.2 |
| Example 41 | 80.2% | 649.6 |
| Example 43 | 94.0% | 690.0 |
| Comparative Example 8 | 69.2% | 560.5 |

As shown in Table 5, life characteristics and discharge capacities of the lithium batteries of Examples 31 to 41 and 43 at a high rate were considerably improved in comparison to the lithium battery of Comparative Example 8.

Evaluaton Example 7

Thermal Stability Evaluation

The coin cells prepared in Examples 31 to 43 and Comparative Example 8 were charged and discharged once at a constant current of about 8.5 mA/g (0.05 C rate) in a voltage range of about 0.01 V to about 1.5 V with respect to lithium metal at about 25° C., and were charged and discharged twice at a constant current of about 17 mA/g (0.1 C rate) in a voltage range of about 0.01 V to about 1.5 V with respect to lithium metal.

Subsequently, the coin cells were charged once at a constant current of about 8.5 mA/g (0.05 C rate) to a voltage of about 0.01 V with respect to lithium metal at about 25° C.

The charged coin cells were disassembled, and then the anode active materials were extracted and dynamic scanning calorimeter (DSC) analyses were performed thereon. DSC analysis results are presented in Table 6 and FIG. 7 below. Calorific values in Table 6 were calculated by integrating exothermic curves of FIG. 7.

TABLE 6

| | Calorific value [J/g] |
|---|---|
| Example 31 | 5200 |
| Example 43 | 5520 |
| Comparative Example 8 | 9050 |

Figure 7:
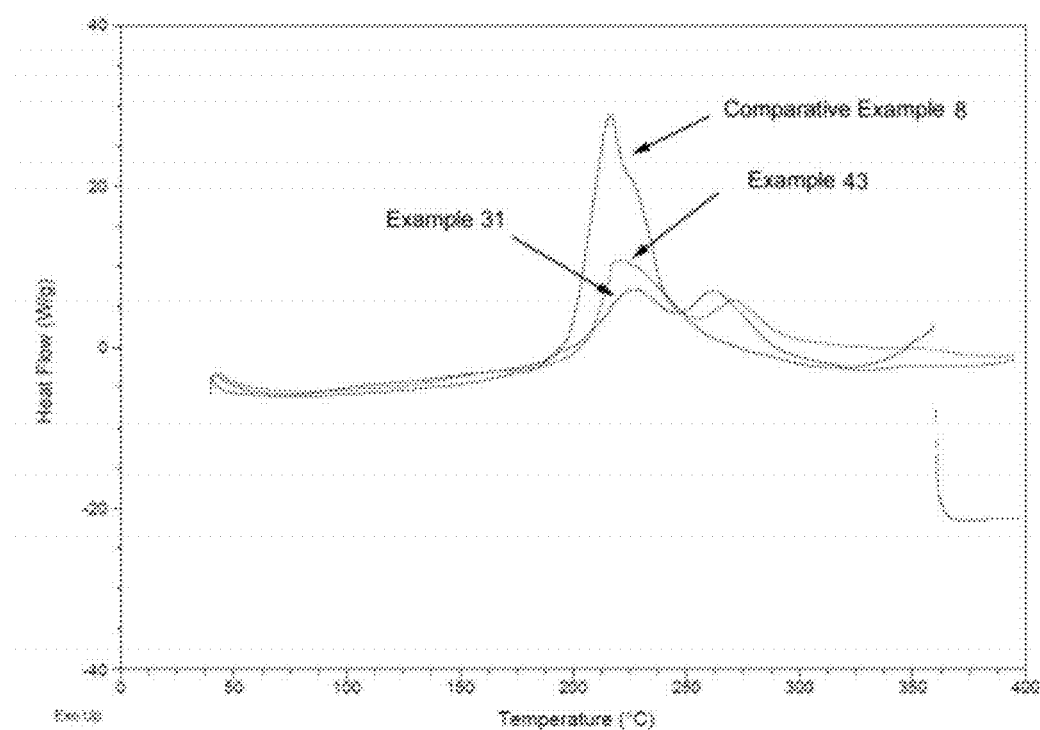
FIG. 7 shows a result of dynamic scanning calorimeter (DSC) measurements of anode active material powders used in Examples 31 and 43 and Comparative Example 8.

As shown in Table 6 and FIG. 7, sizes of exothermic peaks for the anode active material prepared in Examples 13 and 25 and used in the lithium battery of Example 31 and 43 decreased in comparison to a size of an exothermic peak for the anode active material prepared in Comparative Example 7 and used in the lithium battery of Comparative Example 8. Also, temperatures at which the exothermic peaks appear are also increased such that thermal stability of the anode active material used in the lithium battery of Example 25 is improved.

As described above, according to the one or more of the above embodiments of the present disclosure, a discharge capacity, high rate characteristics, and life characteristics of lithium batteries may be improved by including a new anode active material containing a crystalline carbon-based material and titanium-based oxide particles.

As described above, according to the one or more of the above embodiments of the present disclosure, a discharge capacity, life characteristics, and thermal stability of lithium batteries may be improved by including a new anode active material containing a crystalline carbon-based material, titanium-based oxide particles, and a metal alloyable with lithium.

It should be understood that the exemplary embodiments described therein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from the spirit and scope of the present embodiments as defined by the following claims.

What is claimed is:

1. An anode active material comprising:
a core and a carbon-based coating layer formed on the core, wherein the core comprises:
a crystalline carbon-based material having a lattice spacing $d_{002}$ of about 0.35 nm to about 0.40 nm; and
titanium-based oxide particles;
wherein a content of the titanium-based oxide particles ranges from above 0 wt % to about 10 wt % based on a total weight of the core;
wherein the titanium-based oxide is one or more selected from the group consisting of $Li_4Ti_5O_{12}$, $LiTiO_3$, and $Li_2Ti_3O_7$ and
wherein the titanium-based oxide particles contact the crystalline carbon-based material, and
wherein the carbon-based coating layer comprises amorphous carbon.

2. The anode active material of claim 1, wherein the lattice spacing $d_{002}$ of the crystalline carbon-based material is in a range of about 0.35 nm to about 0.38 nm.

3. The anode active material of claim 1, wherein diameters of the titanium-based oxide particles are in a range of about 10 nm to about 990 nm.

4. The anode active material of claim 1, wherein the crystalline carbon-based material has a structure in which n-polycyclic nano-sheets, in which rings composed of 6 carbon atoms connected in a hexagonal shape are fused to one another and arranged on one plane, are stacked along a direction perpendicular to the one plane, where n is an integer from 2 to 250.

5. The anode active material of claim 4, wherein n is an integer from 2 to 50.

6. The anode active material of claim 1, wherein the anode active material is composed of spherical particles having an aspect ratio of about 1 to about 2.

7. The anode active material of claim 6, wherein an average diameter of the particles is in a range of about 1 μm to about 100 μm.

8. An anode comprising the anode active material of claim 1.

9. A lithium battery including the anode of claim 8.

* * * * *